Oct. 25, 1966    H. H. ERICKSEN    3,280,687
MUSIC TEACHING DEVICE
Filed May 13, 1965    4 Sheets-Sheet 2
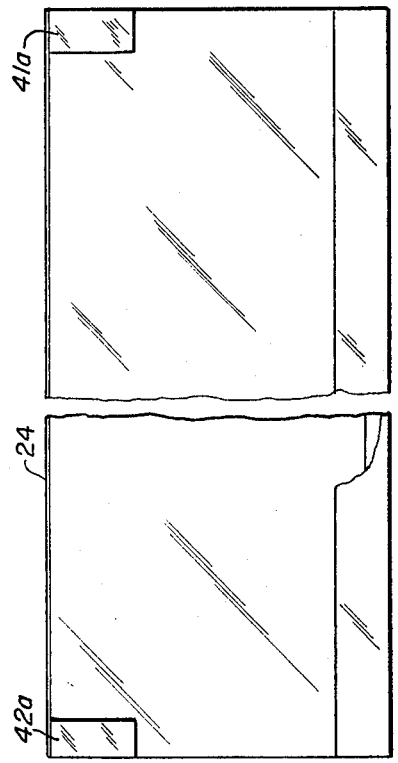
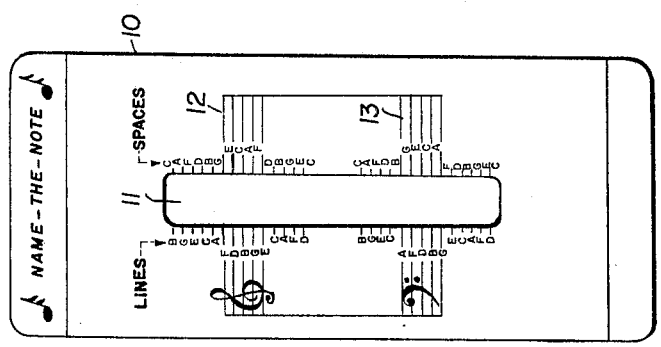
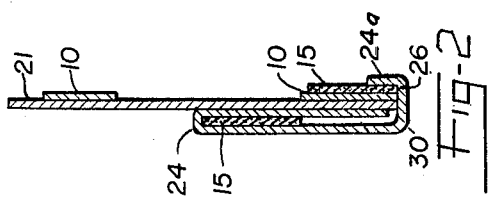
INVENTOR.
HELEN H. ERICKSEN
BY
ATTORNEYS Oct. 25, 1966 H. H. ERICKSEN 3,280,687
MUSIC TEACHING DEVICE
Filed May 13, 1965 4 Sheets-Sheet 3
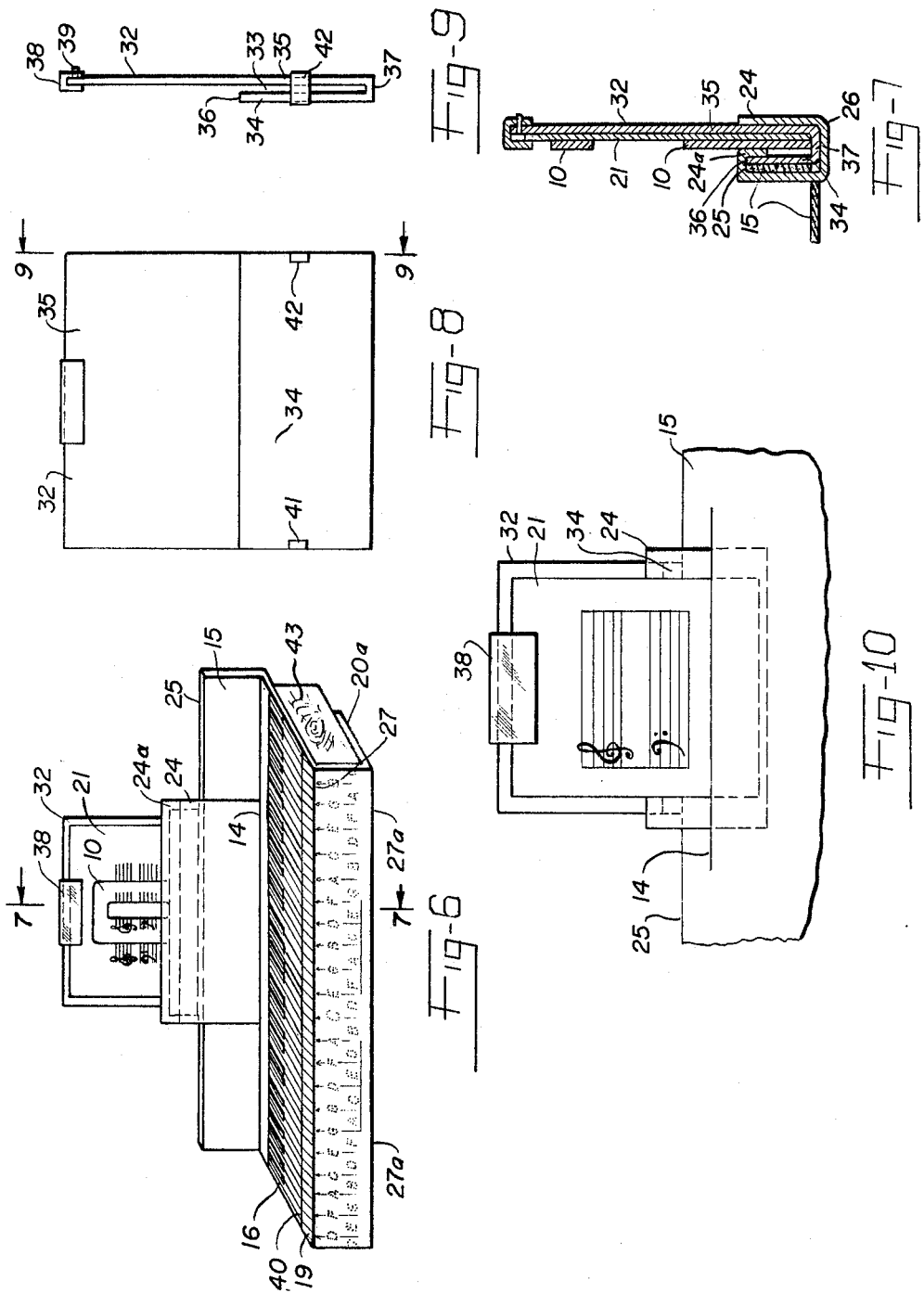
INVENTOR.
HELEN H. ERICKSEN Oct. 25, 1966 H. H. ERICKSEN 3,280,687
MUSIC TEACHING DEVICE
Filed May 13, 1965 4 Sheets-Sheet 4
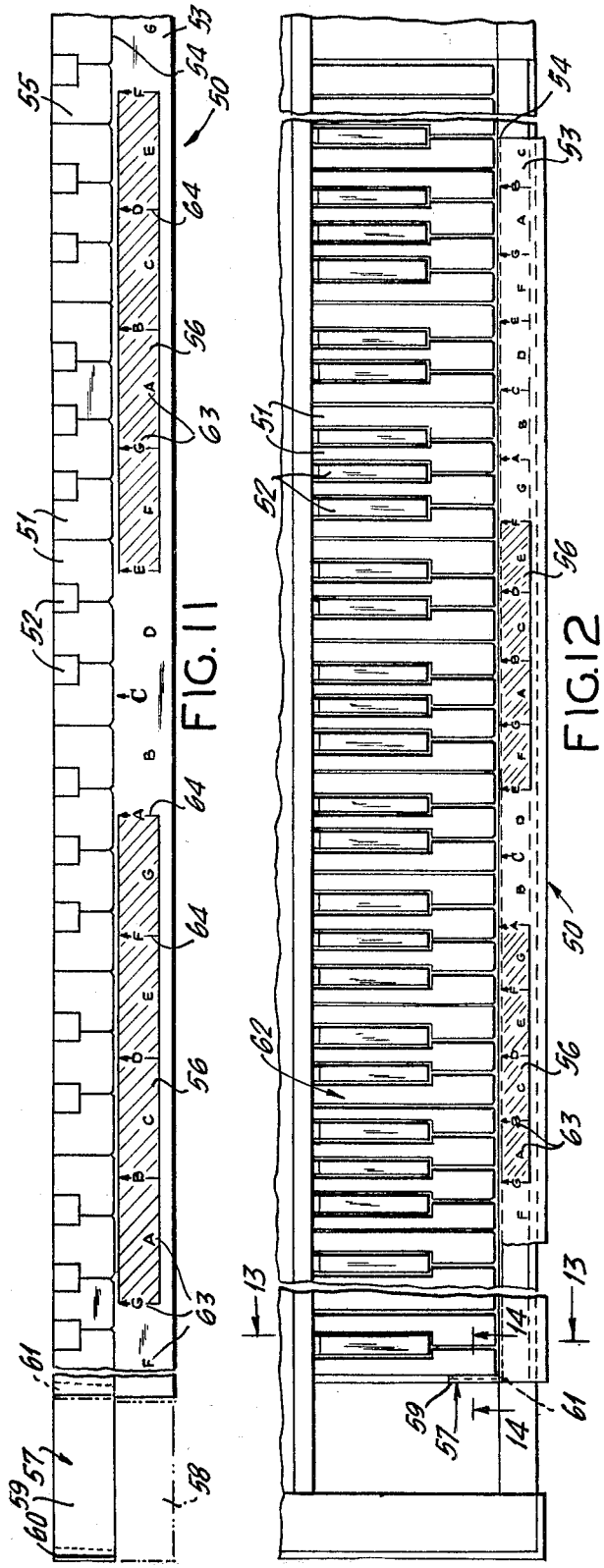
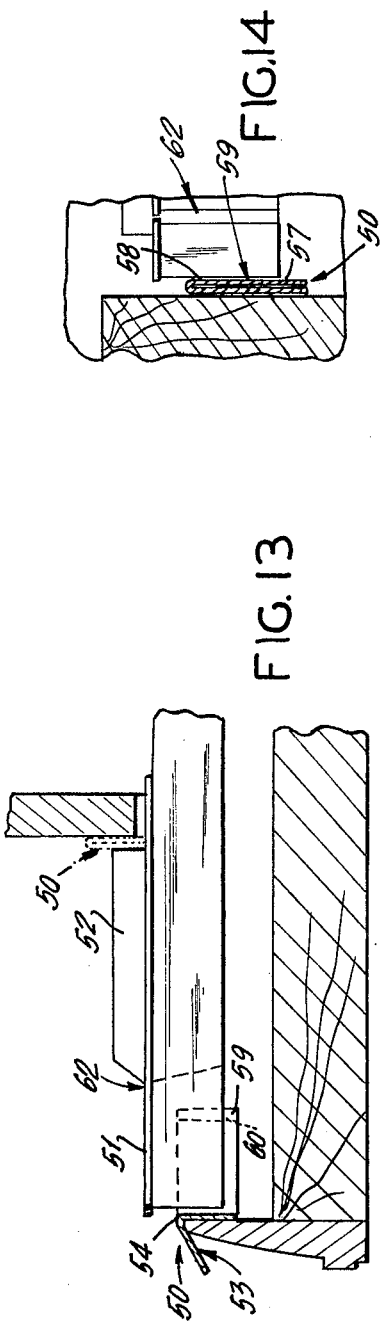
INVENTOR.
HELEN H. ERICKSEN
BY Auslander + Thomas
ATTORNEYS.

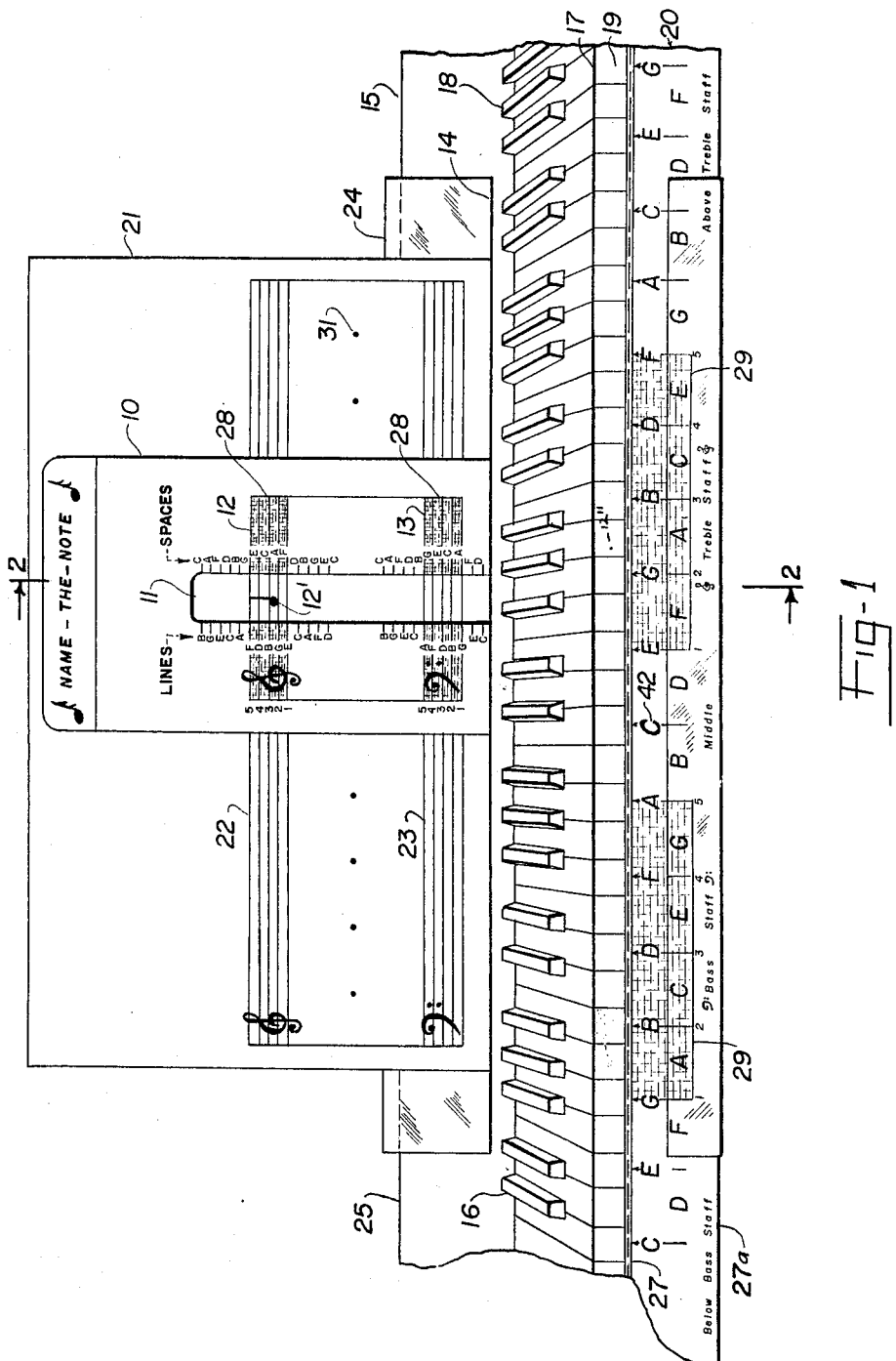

United States Patent Office 3,280,687
Patented Oct. 25, 1966

3,280,687
MUSIC TEACHING DEVICE
Helen H. Ericksen, 199 Keiber Court, Staten Island, N.Y.
Filed May 13, 1965, Ser. No. 459,514
14 Claims. (Cl. 84—480)

This invention relates to music teaching devices and more particularly to music teaching devices for associating the relative positions of musical notes with respect to a musical staff and the keys of a musical instrument, and is a continuation in part of my application Ser. No. 282,699, now abandoned, filed May 23, 1963.

In my previous Patent No. 2,941,436, issued June 21, 1960, there is described a device that overcame the handicaps and disadvantages of the prior art devices which failed to provide any satisfactory usable means for facilitating the formation of mental images to build mental ties between auditory tones, printed notes and/or note names. Briefly, the device, as illustrated in my aforesaid patent, comprises a card upon which is printed a musical staff. The lines and spaces of the printed staff are designated by appropriate note-identifying letters. A window in the shape of a long narrow opening or slot is provided on the card in such a manner that it traverses the lines and spaces of the staff printed thereon. Thus, for example, to identify a particular musical note associated with the staff of a printed music sheet, the window or slot is adapted to be located and placed over the particular note to be identified, the corresponding staff lines of the card and of the music sheet being aligned accordingly. Additional note-identifying lines and spaces, which are properly designated, are also provided on the card above and/or below the printed staff for identification of notes not falling within the staff proper. For a more detailed description of the above-described device, the reader is referred to my aforesaid patent.

The structure in that patent has proved highly useful in accelerating the musical instruction of beginners, especially children, and particularly their ability to read printed music, i.e., name the music notes appearing on a printed music staff. In addition, it has enabled the child to identify the position on a blank printed staff of a particular note that is suggested by the teacher such as by its name and/or by its sound. For example, if the card is associated with and properly placed on a blank printed staff, the child marks the position of the suggested note on the bank staff by means of a pencil or the like inserted through the card window. In this manner, by the action of the hand and the visual image of the marked dot, it is believed that, in accordance with the association theory of the learning process, there is produced a visual and motor image which is tied to the name, and/or sound of the note in the mind of the child. These visual and motor images supplement any auditory images in the mind of the child.

The present invention provides an improved device of the type substantially described hereinabove, for enabling the further building of mental ties between the sound of a note, the key creating the sound, the printed notes and the physical structure of brain and muscle in the body of the learner.

Accordingly, this invention features a music teaching device, a form of keyboard representation in relation to a line and space note indicator. The note indicator is land-marked as by colored patches representing the areas on the keyboard of the notes falling within the lines and spaces of the bass and treble staffs, thus enabling, among other things, the span of notes on printed music to be related by the action of the eye and mind to use the landmark to indicate an actual note on a keyboard of a piano, organ or the like. The note indicator always being able to be used with relation to the keyboard representation for various teaching or learning uses. Available in combination with the basic keyboard representation and note indicator are various combinations such as the keyboard representation and note indicator in foldable relation including a first flat slotted member having at least one staff illustrated thereon with appropriate staff lines and space designations. This member is adapted to designate notes associated with a given music staff whenever this member is placed over a given staff, and a note is exposed through the window or slot. The slotted member may then be used in conjunction with one form of keyboard representation and line and space note indicator which has a horizontal slot on an extended portion extending horizontally above the key representation and adapted to receive the slotted member and a blank or printed music sheet.

Convenient working combinations of the horizontally slotted keyboard representation and line and space note indicator may be had with a transparent plastic sheet which may serve as a support and carrying device and a separate holding member which may be used for holding in conjunction with the plastic sheet or separately, as desired.

The above mentioned and other features of this invention will become more apparent by reference to the following description taken in conjunction with the following drawings, in which:

FIG. 1 is a front view, illustrated in partial form, of a combined form of the music teaching device of the present invention.

FIG. 2 is a sectional view on a reduced scale of the combined embodiment of the invention taken along the lines 2—2 of FIG. 1.

FIG. 3 is a front view of the slotted member of the present invention.

FIG. 4 is a front view, illustrated in partial form, of the plastic transparent member of the present invention.

FIG. 5 is an end view of the plastic transparent member of the present invention.

FIG. 6 is a perspective view of another combined form of the present invention.

FIG. 7 is an enlarged partial sectional view taken along the lines 7—7 of FIG. 6.

FIG. 8 is a front view of the additional support or holder member of the embodiment of FIG. 6.

FIG. 9 is an end view of the holder means illustrated in FIG. 8 taken along the lines 9—9 thereof.

FIG. 10 is a partial front view of an alternative combination form of the present invention in which the slotted keyboard representation and line and space indicator is not utilized in certain applications of the music teaching device of the present invention.

FIG. 11 is a partial view of a strip embodiment of the present invention.

FIG. 12 is a partial plan view of a piano keyboard including the strip embodiment of the present invention.

FIG. 13 is a partial section of FIG. 12 taken at lines 13—13.

FIG. 14 is a partial section of FIG. 12 taken at lines 14—14.

Referring now to the figures in greater detail, where like reference numbers denote like parts in the various figures.

In the form shown in FIGS. 1–9, the device includes the slotted member 10 of the aforementioned patent which is provided with a slot or window 11 and printed staffs 12–13. Some upper and lower ledger line notes of both the treble staff 12 and the bass staff 13 are also printed at the margins of the slot 11. The printing also shows the letter names of the notes, both space notes and line notes, or both the staffs as well as the space notes and line notes associated with the ledger lines above and below each printed staff.

In the form shown, the member 10, which may preferably be, for example, made of a thin flexible cardboard, plastic or other suitable material, is placed upright in a horizontal slot 14 of a keyboard representational line and space indicator second member 15. This second member comprises a base sheet, such as paper, cardboard, plastic or the like, upon which is illustrated, as for example by printing, a diagrammatic picture of a piano keyboard 16, of less than actual keyboard size showing both white keys 17 and black keys 18 and the vertical fronts 19 of the white keys 17.

Below the key fronts 19, on a continuous strip 20 the letter name of the notes printed alternately in a lower or upper row under each white key, the upper row indicating the line notes and including a line at the note letter and an arrow to the white key to which it applies. This, as illustrated in FIG. 1 by way of example only, the line notes are represented by the letters appearing in the upper row and the space notes are represented by the letters appearing in the lower row. The double row makes visualization of the different notes on lines and spaces easier.

By way of example, behind the slotted member 10, may also be upstanding in the same slot 14, a larger white sheet 21 printed with, for example, a blank treble staff 22 and blank bass staff 23, spaced and aligned to match the spacing of the staffs printed on the slotted member 10. It is to be understood, however, as will become apparent hereinafter, that in certain applications utilizing the device of this invention, musical notes may be associated with the staffs 22–23 by printing or otherwise, and the present invention may be used with conventional printed music.

In cases where the member 15 is extremely flexible, it is desirable to provide suitable reinforcing means such as transparent plastic sheet 24 which is passed, for example, upward through the slot 14, bent sharply downward over the top 25 of the base sheet 15 and extended downward to the bottom 26 of the strip 20 and there bent sharply up to cover partly the face of the strip 20.

The strip 20 is normally used for teaching, carrying the components of the present invention or as a reinforcement. To enable the base sheet 15 to be used for test examinations, strip 20 is shown as being readily removable from the sight of the pupil, for example, by folding it over, under key representations 17, 19 and out of sight or, if desired, by tearing it off along a perforated line 27 provided for this purpose at the base of the key fronts 19, as will become apparent hereinafter.

To facilitate further the development of the desired mental images in the pupil's mind, the staffs 12 and 13 are shown distinctively printed, as on colored patches 28, and the strip 20 is shown as being printed at the corresponding lettered notes with landmarks in the form of colored patches 29, which represent the five lines and four spaces of each of the respective staffs 12, 13, as found on the slotted member or most printed music, and thus almost forcibly pointing to the identity of the two forms of note identification. In addition, if desired, the appropriate lines of each of the staffs 12, 13 of slotted member 10 and/or the corresponding notes on strip 20 may be designated by identical numbers 1, 2, 3, 4, 5, respectively, as shown in FIG. 1, as a further visual aid.

It will be noted from FIG. 2 that it is desirable that the bottom edges of the slotted member 10 and the music sheet 21 upon which is illustrated the blank staff 22–23, as well as the bottom edge 26 of the strip 20, all rest at the back of the turn 30 of the plastic strip 24. The strip 20 may carry an auxiliary strip, see for example, strip 20a, FIG. 6, that is normally folded up, but connected detachably by a perforated line, for example, coincident with edge 27a and, which may be used to carry printed directions on use of the device. This same auxiliary strip when appropriately folded may be utilized to cover the face of the strip 20 as an alternative method of concealing the letter name of the notes printed thereon for testing purposes.

A row of widely spacd printed dots 31 on the blank music sheet 21 may serve as guides for spacing the marked notes and for printing in the letter names of notes as explained hereinafter.

Referring now to FIGS. 6–9, there is illustrated another embodiment of this invention, in which is employed an additional support or holder member 32, which is made, for example, of cardboard or the like. Member 32 has a pocket-like portion 33 formed by the flap 34 and back portion 33 thereof.

The slotted member 10 and sheet 21 are adapted to be disposed in the pocket 33. In use, according to one method as shown in FIGS. 6, 7, the flap 24a of the plastic sheet 24 is adapted to fit over the edge 36 of member 32 and the upper edge 25 of member 15 and up through the slot 14. The inner part of lower edge 37 of member 32 is, in turn, adapted to support the lower edges of members 10 and 21. The turn 26 of member 24 is adapted to fit around the outer part of lower edge 37. In this way the members 10, 15 and sheet 21 are supported and maintained in a snug manner. In addition, member 32 may be provided with auxiliary holding means, such as the plastic flap 38 illustrated as being affixed thereto by a rivet 39 or even tape and adapted to maintain the upper edge of sheet 21 therein. The flap 38 may be attached by other conventional means.

Alternatively, the holder 32 may be utilized in the same manner but without the plastic sheet 24 by simply inserting the flap 38 thereof from the back of member 15 and up through the slot 14 thereof.

As an optional visual aid, the member 15 may be folded at perforated line 27 or printed line 40, FIG. 6, and lower edge 27a, and a rectangular member such as, for example, the rectangular board 41 or straight edge of a table, desk or the like inserted therein, thereby creating the optical illusion of a horizontal keyboard as shown in FIG. 6.

In operation of the embodiments of FIGS. 1–9, for example, such as the note A located within the treble staff, is suggested by the instructor in any suitable manner such as by striking it on a piano keyboard or calling it by name. The pupil, in turn, if desired, places a pencil note 12′ to represent the suggested note through the open slot 11 thereby identifying and/or locating the position of the suggested note on the blank staff printed on sheet 21. In addition, if desired, the pupil may place an identifying dot 12″ on the appropriate illustrated key printed on member 15. By utilizing the various designations contained on slotted member 10 in conjunction with those on the strip 20, the pupil is able to identify the key on the keyboard 16 which corresponds to the suggested note which appears or is exposed in the slot 11. In other cases, the suggested notes may be placed diagrammatically beforehand on the sheet 21, in which case the pupil would simply designate the key on keyboard 16 corresponding to note exposed in the slot directly.

The same procedure when followed through, teaches all the key names and staff positions rapidly.

To give a test examination, it is only necessary to conceal the identifying letters and color patches 29 by detaching the strip 20 or alternatively covering them with the aforementioned auxiliary strip.

It is also advisable to print the letter C of Middle C very conspicuously as a memory aid as shown at reference numeral 42, FIG. 1. Focal points such as the line 42 of middle C and the lines at the ends and middle of the landmarks 29 can be used for rapid identification of notes and keys as easily remembered points of eye focus.

In certain teaching applications, the slotted member 10 is not utilized and/or required such as, for example, in the teaching of more advanced pupils. Thus, by way of example, as shown in FIG. 10, the pocket of holder 32 is placed within the fold of the plastic member 24 and the portion of member 15, which is between the upper edge of the slit 14 and the upper edge 25, is disposed between the wall of plastic member 24 and the wall of the flap 34 of holder 32, such that the upper edge of slit 14 rests on the tape pieces 41, 42, c.f. FIGS. 8, 9. The sheet 21 is placed in the slot or slot 14 over the plastic sheet 24, as shown in FIG. 10, or alternatively, if desired, may be inserted in the pocket of the holder 32. In operation, as a note is suggested, the student marks the sheet 21 containing the blank music staff accordingly and/or the appropriate key of the keyboard, not shown for sake of brevity, of member 15, the latter being utilized with or without the strip 20, not shown, for sake of brevity, as desired. Alternatively, the sheet 21 may have been arranged predeterminedly therein printed, or otherwise, notes which the student locates on the proper key, not shown, of the printed keyboard, not shown, associated with member 15, FIG. 10. Here again, the strip 20, not shown, may or may not be utilized as desired with the keyboard of member 15.

Plastic sheet 24 may be provided with tape pieces 41a and 42a, which not only serve the same function of acting as a rest for the slot 14 of second member 15, but also may serve to form a pocket engageable with the holder 32, grasping it at flap 24a. Thus, in addition to the pocket portion 33, a further pocket holding area is formed between the wall 24b of the plastic 24 and the back portion of the back portion 35 of holding member 32.

The embodiments of FIGS 1–10 show various teaching applications of the base keyboard representation and line and space indicator 15 with a horizontal slot 14 in both teaching use and with support means. By use of such base sheet 15, the advantages of both piano and music are obtainable for study use in a pocket, which may be used for study purposes away from the actual piano.

In practice it is also important to have available for use, with or without the piano, a teaching or learning aid patterned to the actual size keyboard of a piano, organ or the like and adapted to be used with or without such instrument.

In FIGS. 11–14 a foldable key representation and line space indicator strip 50 is shown. The white keys 51 and black keys 52 are justaposed to a continuous strip 53 along a folding line 54.

In this embodiment of the present invention the white keys 51 are in actual proportion to white keys of piano, organ or the like and the black keys 52 are shown in relation to their relative positions on a keyboard instrument but superimposed on the white keys 51 on the upper strip portion 55. The landmark colored patches 56 and ledger lines and space indicators are identical to those on the strip 20 except they are in actual proportion to keys of piano, organ or the like.

The upper end 57 of the strip 50 extends beyond the piano key 51, 52 area. A portion 58 which is severed from the strip 53 from the fold line 54 down and foldable to form a tab 59 which may be suitably held, folded by pieces of tape 60, 61 when required.

While a tab may be formed at the end of the strip 50 by the removal of the portion 58 of the continuous strip 53, it has been found that by folding and holding the tab 59 with the pieces of tape 60, 61, provides a reinforcement of the tab 59 which helps hold it in place better when the strip 50 is used with an actual piano keyboard 62 as shown in FIG. 12.

For convenience, an indicator 63 may be provided to indicate where a cut may be made to adjust the strip 50 to a less than standard size keyboard such as found on a contemporary spinet. In such case, the portion of the continuous strip 53 may be cut out, cut and folded upward and/or cut out or folded with the tapes 60, 61 being suitably adjusted for the new tab length.

In use the strip 50 may be used on piano keyboard by inserting the tab 59 bent at a right angle to the strip 50 between the end key of the piano keyboard 62 and the frame of the piano with the upper strip 55 extending longitudinally holding the length of the strip 50 rigidly holding the strip 53 bent over the edge of the front of the piano between the front of the keys and the piano frame with the landmarks 56 and ledger lines on the strip 53 extending outward and/or downward each pointing to the actual keys 51. The inserted strip is clearly illustrated in FIGS. 13, 14.

The strip 50 itself while not ordinarily employed thusly can be used in conjunction with the keyboard instrument with regular music and the combination of music sheets 21, plastic sheet 24 and holder 32 and slotted member 10, either on the keyboard, piano, organ or the like when the strip is employed, as shown in FIGS. 12–14, or off the keyboard instrument with the bend line on strip placed on straight edge of table or desk for study.

In all instances of use of the strip 50 or base sheet 14, the landmark colored patches 29, 56 mark the physical area of the key found in the various clefs so that the eye and mind can be impressed with the notes on written music and the actual keys of piano, organ or the like. The letter designations 13 on the strips 20, 53 enable the learning association patterns to include the letter names of notes. The line designations 14 relate notes to their ledger line relationship to the various clefs. The landmark color patch as set up with the lines represent a vertical span of the usually horizontal staff lines at the keyboard or keyboard representation enabling increased ease in note learning.

While note markers are old, ordinary landmark 56 of the strip 50 can still be used to mark the notes as shown when placed behind the black keys 52 in FIG. 13 with the landmarks 56 serving their function of relating the keyboard to the lines and spaces of the staffs and the ledger lines and spaces.

The terms and expressions which are employed are used as terms of description, it is recognized, though, that various modifications are possible within the scope of the invention claimed.

Having thus described certain forms of the invention in some detail, what is claimed is:

1. A music teaching device comprising a first strip including; one row of markings with a line thereat corresponding to the line notes of written music; a second row of markings each marking corresponding to space notes of written music; a landmark area including said line and space note markings differentiated by a distinctive color and corresponding to the line and space notes of the treble staff; an area including said line and space note markings differentiated by a distinctive color and corresponding to the line and space notes of the bass staff, a keyboard representation, said first strip juxtaposed to said keyboard representation with said rows of line and space notes aligned with their corresponding keys, a fold line separating said first strip and keyboard representation, and an extended portion extending vertically beyond said keyboard representation including a horizontal slot.

2. A music teaching device comprising a first strip including; one row of markings with a line thereat corresponding to the line notes of written music; a second row of markings each marking corresponding to space notes of written music; a landmark area including said line and space note markings differentiated by a distinctive color and corresponding to the line and space notes of the treble staff; an area including said line and space note markings differentiated by a distinctive color and corresponding to the line and space notes of the bass staff, a keyboard representation, said first strip juxtaposed to said keyboard representation with said rows of line and space notes aligned with their corresponding keys, a fold line separating said first strip and keyboard representation, said fold line including perforations and an extended portion beyond said keyboard representation including a horizontal slot.

3. A music teaching device comprising a first strip including; one row of markings with a line thereat corresponding to the line notes of written music; a second row of markings each marking corresponding to space notes of written music; a landmark area including said line and space note markings differentiated by a distinctive color and corresponding to the line and space notes of the treble staff; an area including said line and space note markings differentiated by a distinctive color and corresponding to the line and space notes of the bass staff, a keyboard representation, said first strip juxtaposed to said keyboard representation with said rows of line and space notes aligned with their corresponding keys, a fold line separating said first strip and keyboard representation; a foldable strip beneath said first strip, and an extended portion extending vertically beyond said keyboard representation including a horizontal slot.

4. A music teaching device comprising a first strip including; one row of markings with a line thereat corresponding to the line notes of written music; a second row of markings each marking corresponding to space notes of written music; a landmark area including said line and space note markings differentiated by a distinctive color and corresponding to the line and space notes of the treble staff; an area including said line and space note markings differentiated by a distinctive color and corresponding to the line and space notes of the bass staff, a keyboard representation, said first strip juxtaposed to said keyboard representation with said rows of line and space notes aligned with their corresponding keys, a fold line separating said first strip and keyboard representation, with said rows of line and space notes aligned with their corresponding keys, said keyboard portion adapted to fit in the space in front of the white keys and behind the frame of a keyboard instrument, and an extended portion beyond said keyboard representation forming a tab extending from said keyboard portion adapted to be inserted adjacent a key of a keyboard instrument at a right angle to the said first and second strip.

5. A music teaching device comprising a first strip including; one row of markings with a line thereat corresponding to the line notes of written music; a second row of markings each marking corresponding to space notes of written music; a landmark area including said line and space note markings differentiated by a distinctive color and corresponding to the line and space notes of the treble staff; an area including said line and space note markings differentiated by a distinctive color and corresponding to the line and space notes of the bass staff, a keyboard representation, said first strip juxtaposed to said keyboard representation with said rows of line and space notes aligned with their corresponding keys, a fold line separating said first strip and keyboard representation, and an extending portion extending horizontally beyond said keyboard representation including a bent portion of said note marking section severed to said fold line and adhesive tape means hold said severed portion to said note portion in the form of a tab.

6. A music teaching device comprising in combination a first strip including; one row of markings with a line thereat corresponding to the line notes of written music; a second row of markings each marking corresponding to space notes of written music; a landmark area including said line and space note markings differentiated by a distinctive color and corresponding to the line and space notes of the treble staff; an area including said line and space note markings differentiated by a distinctive color and corresponding to the line and space notes of the base staff, a keyboard representation, said first strip juxtaposed to said keyboard representation with said rows of line and space notes aligned with their corresponding keys, a fold line separating said first strip and keyboard representation, an extended portion beyond said keyboard representation including a horizontal slot, a flat slotted member having at least one staff illustrated thereon with appropriate staff line and space designations and adapted to designate notes associated with a given music staff whenever said member is placed over said given music staff and a note thereof is exposed through the slot of said member, said flat slotted member adapted to fit into said horizontal slot said designated note also being found on said first strip.

7. A music teaching device according to claim 6 comprising further means for reinforcing said keyboard and note indicator member.

8. A music teaching device according to claim 6 wherein said means for reinforcing comprises a transparent plastic member.

9. A music teaching device according to claim 8 further comprising at least one member adopted to support said plastic member.

10. A music teaching device according to claim 9 wherein such supporting means is a member having a flap portion adapted to hold such said slotted member music staff and plastic member and said keyboard and note indicator mark.

11. A music teaching device comprising in combination, a first paper sheet member having a music staff printed thereon, a flat slotted member having at least one staff printed thereon with appropriate staff line and space designations and adapted to designate the note exposed through the slot of said member placed over the staff of such first member, and a second paper sheet member having a keyboard printed thereon with appropriate line and space note designations for predetermined keys of said keyboard and adapted to designate the key of said keyboard corresponding to the note exposed through said slot, supporting means having a flap portion adapted to hold such said first and second sheet members and said flat slotted member and adapted to reinforce said second member and maintain said first and second sheet members and said flat slotted member in a predetermined relationship.

12. The invention of claim 11 wherein the said line and space note designation portion includes one row of markings with a line thereat corresponding to the line notes of written music, a second row of markings each marking corresponding to space notes of written music, a landmark area including said line and space note markings differentiated by a distinctive color and corresponding to the line and space notes of the treble staff, an area including said line and space note markings differentiated by a distinctive color and corresponding to the line and space notes of the bass staff.

13. A music teaching device according to claim 11 wherein said supporting member is a third member having a flap portion adapted to hold said first member, said flat slotted member and said second member and a fourth plastic transparent member adapted to hold said third member.

14. The invention of claim 13 wherein the said line and space note designation portion includes one row of markings with a line thereat corresponding to the line notes of written music, a second row of markings each marking corresponding to space notes of written music, a landmark area including said line and space note markings differentiated by a distinctive color and corresponding to the line and space notes of the treble staff, an area including said line and space note markings differentiated by a distinctive color and corresponding to the line and space notes of the bass staff.

References Cited by the Examiner

UNITED STATES PATENTS

| | | | |
|---|---|---|---|
| 979,193 | 12/1910 | Nelson | 84—473 |
| 2,249,391 | 7/1941 | Macaffrey | 84—478 |
| 2,332,842 | 10/1943 | Champion | 84—473 |
| 2,497,364 | 2/1950 | Mayberry | 84—473 |
| 2,941,436 | 6/1960 | Ericksen | 84—473 |
| 2,944,349 | 7/1960 | Kaufman | 84—473 X |

RICHARD B. WILKINSON, *Primary Examiner.*